United States Patent

MacMillan

[15] 3,675,495
[45] July 11, 1972

[54] WHEEL BALANCING APPARATUS

[72] Inventor: Charles W. MacMillan, Rock Island, Ill.
[73] Assignee: Applied Power Industries, Inc.
[22] Filed: Feb. 25, 1970
[21] Appl. No.: 14,073

[52] U.S. Cl. .............................................. 73/466, 73/71.4
[51] Int. Cl. .................................................. G01m 17/02
[58] Field of Search .................... 73/466, 457, 459, 71.4; 200/61.45

[56] References Cited

UNITED STATES PATENTS

| | | | |
|---|---|---|---|
| 2,565,577 | 8/1951 | Schnoebelen | 73/466 X |
| 2,680,966 | 6/1954 | Adkins | 73/466 X |
| 3,274,486 | 9/1966 | Gould et al. | 73/466 X |
| 3,115,042 | 12/1963 | Thomas et al. | 73/466 |
| 3,023,613 | 3/1962 | Crawford | 73/466 X |
| 3,203,254 | 8/1965 | Thomas et al. | 73/466 |
| 3,254,528 | 6/1966 | Michael | 73/71.4 |

Primary Examiner—Jerry W. Myracle
Attorney—Gary, Juettner, Pigott & Cullinan

[57] ABSTRACT

Method and apparatus for balancing vehicle wheels by stroboscopic light balancing means wherein the vehicle wheel is freely suspended and driven up to high speed, the vibrations of the rotating wheel are sensed, and the stroboscopic light is flashed on the wheel in timed relationship to the vibrations thereof to given an indication of the location of the imbalance causing the vibration; characterized by improved pick-up means consisting essentially of a housing adapted to be adhered to a part of the vehicle that is normally stationary but which vibrates responsively to the vibrations caused by wheel imbalance, and accelerometer means mounted in said housing having a plane of sensivity adapted to be disposed in the vertical direction for picking up static imbalance and in the horizontal direction for picking up dynamic imbalance; and further characterized by derivation of signals from said accelerometer means at a position remote from the rotating wheel, coupling each derived signal to a pulse counter for determining wheel speed, and determining wheel imbalance at a pre-selected speed.

9 Claims, 6 Drawing Figures

Inventor:
Charles W. MacMillan
By Gary, Parker,
Juettner, Pigott & Cullinan Atty's

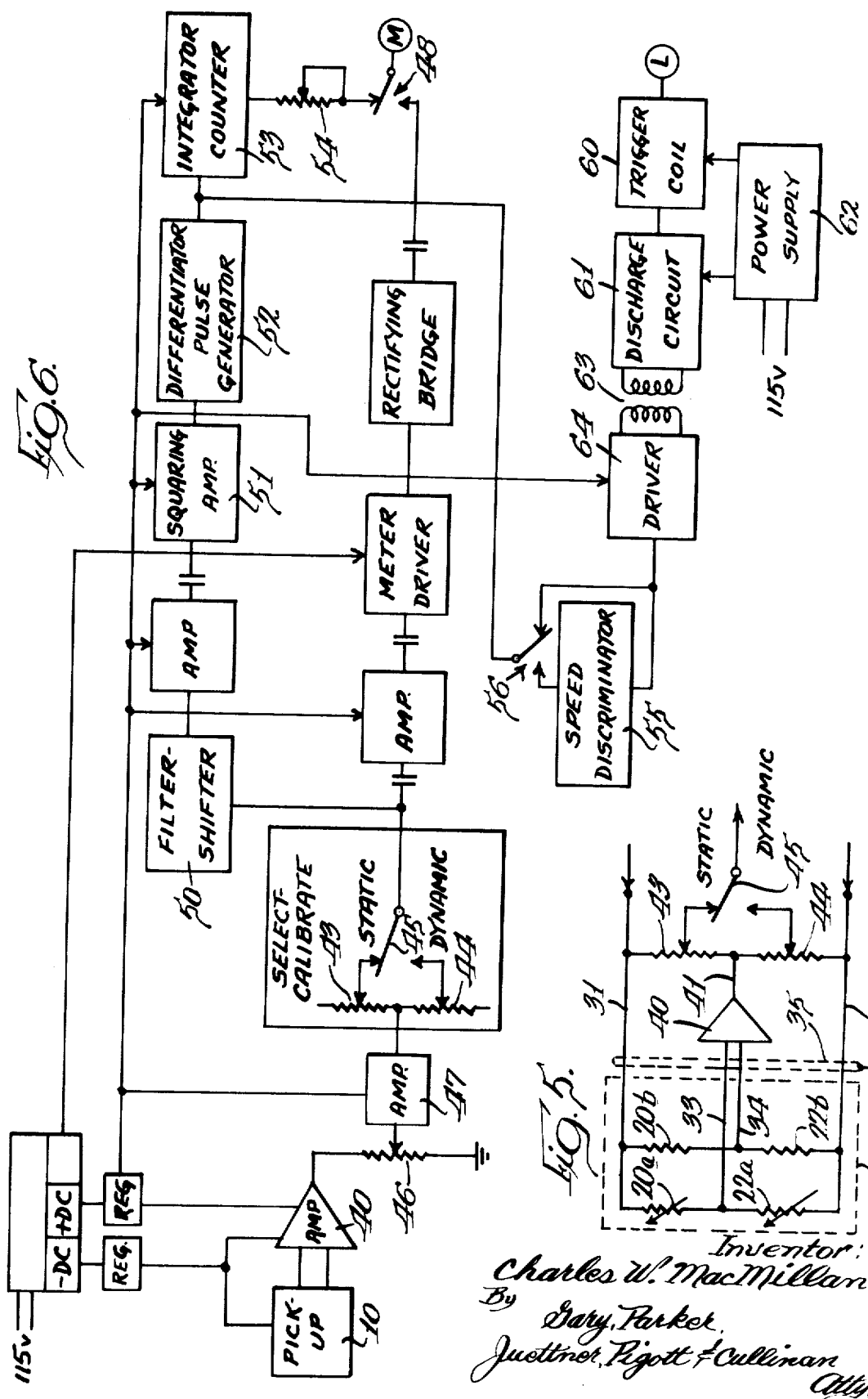
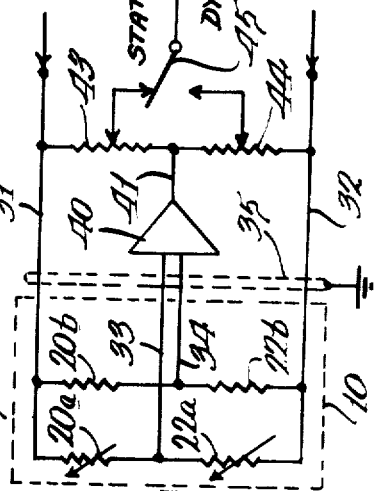

WHEEL BALANCING APPARATUS

BACKGROUND OF INVENTION

Wheel balancers of the stroboscopic light type for balancing vehicle wheels directly on the vehicle have been known for quite some time. In essence, these devices comprise a pick-up unit to be attached to the backing plate or other stationary part of the vehicle wheel suspension, electromagnetic coil or like means in the pick-up for generating a pulse-type electric signal corresponding to the vibrations of the vehicle wheel (when the vehicle wheel is jacked up and spun up to high speed), an amplifier for amplifying the electric signal from the pick-up, a strobe light circuit which causes a strobe light to flash in synchronism with the electrical impulses produced by the vibrating wheel, the strobe light being disposed to shine on the wheel and give the visual impression of stopping the rotating wheel in a position indicative of the heavy point on the wheel which produces the imbalance and thus the vibration, and a meter circuit for indicating the amplitude of the vibration and thus the amount of imbalance, i.e., the amount of counter-balancing weight that should be applied to balance the wheel.

The pick-up usually comprises a stand to be rested on the garage floor and containing a stationary coil, an armature reciprocable in the coil and means (usually a magnet) for attaching the plunger to the rear face or plate of a non-rotating part of the wheel suspension. Usually, the coil structure is pivotally mounted on the stand so that the armature may extend therefrom either vertically or horizontally. In the vertical position, the armature moves vertically in the coil in accordance with the up and down vibrations of the wheel thereby to produce a signal indicative of the vertical or "static" imbalance of the vehicle wheel. In the horizontal position, and with the armature located eccentrically of the wheel axis, the armature moves proportionally to the in and out vibrations or "dynamic" imbalance of the wheel. Therefore, in a balancing operation, it is necessary to set the pick-up unit in a first position for "static" balancing and in a second position for "dynamic" balancing.

These prior art pick-up units have suffered many disadvantages, principally the difficulty of obtaining the paper relationship between the floor mounted coil and the vibratorily movable armature considering the extremes in variation of wheel movement depending on the nature and degree of wheel imbalance, particularly the compound movements of the wheel resulting from composites of static and dynamic imbalances. The difficulty of properly adjusting the pick-up unit has led to consequent questionable reliability of the measurements made therewith. Also, with this type of pick-up unit, it was necessary for the operator to crawl under the vehicle repeatedly to readjust the pick-up unit to secure proper adjustment thereof and also to position the same for separate measurement of static and dynamic imbalance.

SUMMARY OF THE INVENTION

A particular object of the present invention is the provision of an improved pick-up unit that is totally self-contained and adapted to be mounted on the vehicle without any connection to the floor or any other fixed reference; and that embodies therein accelerometer means for picking up wheel vibrations in the respective planes in a totally reliable manner. Additionally, it is preferred to embody in the pick-up a pair of accelerometers, one sensitive solely to wheel movement in the vertical direction and the other sensitive to wheel movement solely in the horizontal direction, whereby the device will pick up in a single position of attachment the respective vibrations caused by each of static and dynamic imbalance.

It is specifically an object of this invention to provide an improved pick-up unit consisting essentially of a housing adapted to be adhered to a part of the vehicle that is normally stationary but which vibrates responsively to the vibrations caused by wheel imbalance, a first accelerometer mounted in said housing with its plane of sensitivity in the vertical direction for picking up static imbalance, and a second accelerometer mounted in said housing with its plane of sensitivity in the horizontal direction for picking up dynamic imbalance.

Another object of the invention is to provide a circuit for receiving signals from said accelerometer means, determining therefrom the speed of wheel rotation, compensating the flasher circuit of the strobe light correlative to wheel speed, and determining imbalance at a thus compensated wheel speed. One phenomenon of a rotating unbalanced mass is that displacement of the mass lags the locus of imbalance thereof by a progressively increasing phase angle as the speed increases, up to a maximum of 180°. The object of the present invention is to compensate automatically for the phase angle by appropriate shifting of the phase of the signals received from the pick-up accelerometer means; specifically, for example, to provide a predetermined phase shift of the signals and to determine wheel imbalance solely in the range of the preselected speed that is correlative to such phase shift.

A still further object of the invention is to provide an improved method of balancing vehicle wheels in accordance with the principles above stated.

Other objects and advantages will become apparent as the description proceeds.

THE DRAWINGS

FIG. 5 is a schematic circuit diagram of the pick-up unit and the elemental components of the signal receiving circuit; and FIG. 6 is a block diagram of the circuit.

DESCRIPTION

Figure 1:
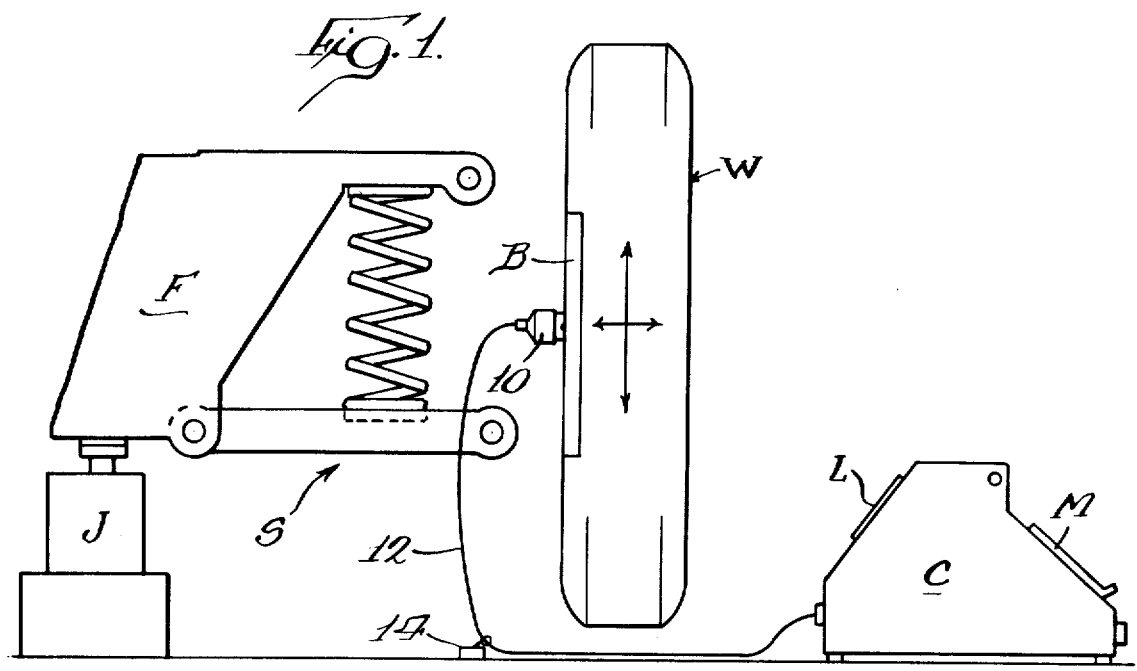
FIG. 1 is a somewhat schematic representation of a vehicle wheel and is suspension that have been jacked up to accommodate balancing, and the apparatus of the invention associated therewith for performing the balancing function.

FIG. 1 shows fragmentarily the customary set-up for wheel balancing by stroboscopic light means, except for the specific form of pick-up unit illustrated. In FIG. 1, the conventional king pin and/or ball joint assembly for attaching the wheel W to its spring suspension S has been omitted for the sake of clarity in illustrating the balancer components.

Figure 2:
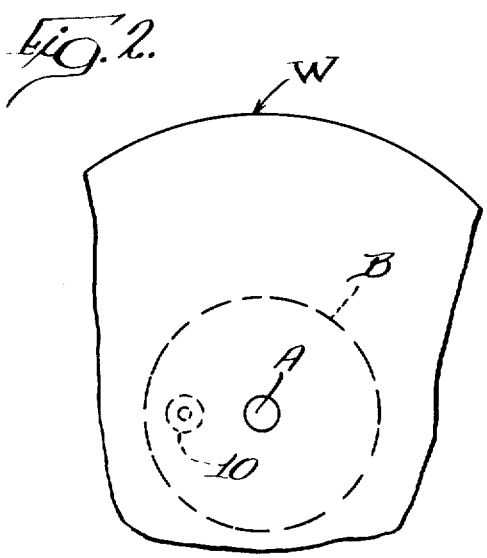
FIG. 2 is a fragmentary elevational view of the vehicle wheel illustrating a preferred location for the pick-up unit of the invention.

As shown, the vehicle frame F is elevated by a jack J so that the wheel W is freely suspended in air above the garage floor by means of its spring suspension S. The pick-up unit 10 of the present invention is then attached to a part of the vehicle that is normally stationary but nevertheless responsive to the vibrations produced by imbalance of the wheel W when the wheel is rotated at high speed. The preferred location for the pick-up unit 10 is on the non-rotatable backing plate B of the wheel spindle or axle A in a position substantially within or adjacent the horizontal plane of the spindle or axle, but eccentric of the axle as shown in FIG. 2. In this location, the pick-up unit will have precisely the same vertical excursion as the wheel and an in-and-out or horizontal excursion proportional to the horizontal oscillation of the wheel about its turning axis, i.e., the axis of its king pin or ball joint suspension.

As previously noted, imbalance of the wheel circumferentially thereof will cause vertical vibration of the wheel when it rotates at high speed. Despite the fact that the wheel is then operating dynamically, the cause of the vertical excursion of the wheel has been termed "static" imbalance. Imbalance of the wheel relative to its vertical median plane in turn produces horizontal vibrations, but since the wheel is mounted on an essentially vertical turning axis these vibrations do not produce significant horizontal movement of the wheel on its vertical center line, but instead induce horizontal oscillatory movement of the wheel about said turning axis. This is called "dynamic" imbalance, and to sense it, the pick-up is preferably located on or near the horizontal center line of the wheel and as far from its axle as reasonably feasible.

A lead 12 extends from the thus mounted pick-up 10 to a mobile cabinet C containing appropriate electrical circuitry, a meter M for registering the magnitude of the signal produced by the pick-up, and a stroboscopic light L adapted to be flashed in time with the vibrations of the wheel. The cabinet is movable so that it can be placed in a location opposite the wheel with the strobe light L positioned to flash light on the wheel.

Inasmuch as the pick-up 10 does not have a floor mounted component or other fixed reference, a movable anchor 14 is associated with the lead 12 to keep it out of the way of the wheel and wheel suspension.

With the components of the apparatus thus associated with the wheel, a spinner (not shown) is engaged with the wheel and operated to drive the wheel in the direction of its normal forward rotation to a relatively high speed, after which the spinner is disengaged from the wheel to permit the same to rotate freely under conditions fairly closely simulating road conditions.

If the wheel is unbalanced, the same will bounce or vibrate vertically and/or horizontally whereupon the pick-up will emit signals proportional to the degree of vibration and thus proportional to the amount of unbalance producing the vibration. These signals are pulses having an upper peak and a lower peak corresponding to the upper and lower limits (or inner and outer limits) respectively of wheel excursion on each revolution of the wheel. The circuitry in the cabinet C picks one or the other of these peaks and pulses the strobe light L once per wheel revolution, with the result that the rotating wheel under the influence of the flashing light appears to the human eye to be standing still, i.e., "stopped." Usually, for "-static" balance the light is flashed as a function of the lower limit of wheel excursion, whereby the wheel is "stopped" in a position where the unbalanced mass is at or adjacent the bottom of the wheel (subject to the phase angle of lag of wheel displacement as mentioned hereinbefore and discussed in greater detail hereinafter). By putting a radial chalk mark on the tire, or selecting a distinctive feature on the wheel or tire, the stroboscopically "stopped" position of the wheel can be observed and noted.

At the same time, the meter M can be read to determine the amplitude of the signal and thus the magnitude of the vibration, consequently to obtain an indication of the unbalanced mass producing the vibration. Actually, what is measured is the force or moment (foot pounds of energy) causing the vibration. However, knowing that the weight to be applied to counterbalance the unbalanced mass is going to be applied to the rim of the wheel, the moment arm of the counterbalance is known and thus the mass of the counterbalance can be selected to produce an equal and opposite force or moment. Consequently, by appropriate testing and calibration, the meter can be scaled to read in ounces of counterbalance weight required.

The wheel is then physically stopped, manually rotated to the stroboscopically "stopped" position noted under the flashing light, and the weight indicated by the meter applied at a location on the wheel rim opposite the point that is supposedly the locus of the unbalanced mass. The wheel is then re-spun to insure that "static" balance has been achieved, whereafter the wheel can be balanced dynamically by following an analogous procedure.

That is the theory and basic methodology of stroboscopic wheel balancing. However, it has not heretofore been either that straight-forward or that simple to attain wheel balance. Much guess work and cut-and-try experimentation has been necessary, even by experienced operators.

The present invention overcomes many disadvantages of the prior art apparatus and methods, and provides for stroboscopic wheel balancing with particular ease and reliability. Many of the advantages of this invention are attributable to the pick-up unit provided hereby, which will now be described in connection with FIGS. 3 and 4.

The pick-up unit 10 of the invention is particularly characterized by the use of accelerometer means as a transducer for converting wheel vibration to a sensible electric pulse signal by simple attachment thereof to the vibratory system without physical connection to the floor or any other fixed reference. An accelerometer is, of course, made to measure the acceleration of a moving body, but it has been discovered by this invention that an accelerometer will perform successfully in developing a signal that is both sensible and reliable for purposes of determining the locus of a vibration producing unbalance and the amplitude of the vibration produced. Moreover, it has been discovered by this invention that an accelerometer will develop a useful and reliable signal for such purposes without necessity for the fixed reference that has heretofore been such a deterrent to practical stroboscopic wheel balancing.

Thus, in accordance with the discoveries of this invention, a miniature accelerometer sensitive to movement in a single plane is employed as the prime vibration pick-up or sensing unit. An accelerometer, rated at suitable for the purpose is the "Endevco Pixie" accelerometer, rated at 10 mv/g. Such an accelerometer is extremely small and lightweight, yet provides a signal that is reliably reproducible, whereby to facilitate a totally self-contained pick-up. Further, in the preferred embodiment of the invention, two such accelerometers are used, one to sense vibration in the vertical direction and the other to sense vibration in the horizontal direction, so that a single position of attachment of the pick-up unit 10 to the vibrating system will provide for determination of both "static" and "-dynamic" balance. However, it is manifest that a single accelerometer would suffice, provided the same is moved at right angles to itself between the "static" and "dynamic" tests.

Figure 3:
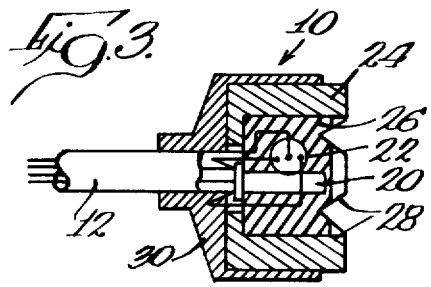
FIG. 3 is a vertical longitudinal section of a preferred embodiment of the pick-up unit.
Figure 4:
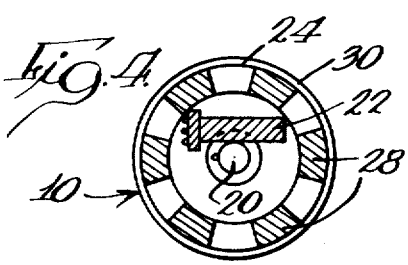
FIG. 4 is a front elevation of the pick-up unit as the same would appear prior to bonding the accelerometers in place therein.

A preferred embodiment of the pick-up unit 10 is shown in FIGS. 3 and 4, wherein a pair of miniature accelerometers are mounted at right angles to one another, namely, a first accelerometer 20 mounted with its axis or plane of sensitivity in the vertical direction and a second accelerometer 22 mounted with its axis or plane of sensitivity in the horizontal direction.

For convenience in handling and to protect them from damage, the accelerometers are preferably encased in a housing 24, suitably by being imbedded in and encapsulated by an epoxy filling 26 in the housing. To facilitate attachment of the pick-up unit 10 to the vibrating system, and considering that most parts of automotive vehicles are ferromagnetic, it is preferred to form the housing 24 as a tubular shell of ferromagnetic material, to notch one end face thereof to define pole pieces 28, and then to magnetize the same whereby the unit may be detachably adhered to a vehicle part by magnetic attraction.

To complete the assembly, the multiple conductors of the lead 12 (four conductors plus a conductive shield) are connected to the accelerometers and the housing 24, and the lead is secured to the housing by a suitable non-conductive molding 30.

In the finished assembly, the pick-up unit 10 may be as small as one to two inches in diameter and one to 2 inches in length, depending upon convenience of handling by an operator, provision for adequate structural strength, etc. Consequently, the unit is very small and very lightweight, and thus easily and quickly adhered to a part of the vibrating system, such as the wheel spindle backing plate B. Since the unit presents so little mass in and of itself, conventional attaching means will cause the unit to stay adhered to the system despite extreme vibratory shock. While other means could be employed for adhering the pick-up to a part of the system, the self-contained permanent magnet provided by the pole pieces 28 greatly facilitates secure attachment and ready detachment.

The basic circuitry of the pick-up unit, the lead 12 and the means for selectively obtaining signals from the two accelerometers is shown in FIG. 5, wherein the pick-up assembly is depicted within the dotted lines. As shown, the accelerometers essentially comprise a bridge circuit including a pair of variable resistances 20a and 22a corresponding respectively to the accelerometers 20 and 22, and including reference resistances 20b and 22b respectively. The bridge is energized by a DC power supply (indicated by the input arrows) via conductors 31 and 32 forming part of the lead 12. Output is derived from center taps to the resistance pairs 20a –22a and 20b –22b via conductors 33 and 34 also forming part of the lead 12. Preferably these conductors are shielded by a grounded shield 35 on the lead 12, whereby the output signals of the accelerometers may be conducted to the cabinet C (FIG. 1) without interference or distortion from outside or extraneous energy sources.

Within the cabinet C, the signals of the accelerometer are conducted to an amplifier 40 which produces an output signal 41 comprising the amplified resultant of the resistance factors. The potential across the respective branches 31–41 and 32–41 may then be derived by respective calibrating potentiometers 43 and 44, the taps of which lead to respective contacts of a manually operated selector switch 45, whereby the balancer operator may at his selection derive a signal (indicated by the output arrow) from either one of the two accelerometers, i.e., the pulsating signal produced by the variable resistance 20a as a consequence of vertical vibration or "static" imbalance or the pulsating signal produced by the variable resistance 20b as a consequence of horizontal vibration or "dynamic" imbalance.

Referring now to FIG. 6, there is shown by block diagram the remainder of the circuit provided by this invention for securing reliable readings of the locus of the imbalance and the amplitude of the vibration produced thereby. As sketched, the pick-up unit 10 and the amplifier 40 are energized from a DC power supply, preferably a multiple-purpose power supply operating on the standard 115 volt AC line. The output 41 of the amplifier is conducted to a gain controller 46, thence to a second stage amplifier 47, and then to the calibration and selection assembly comprised of the potentiometers 43 and 44 and the selector switch 45.

The selected and calibrated signal is then fed into two channels, namely, a pulse channel (shown in the upper portion of FIG. 6) and an amplitude channel shown to the right of the "-calibrate-select" component. In the latter channel, the signal is amplified and rectified and fed to the meter M. Preferably, the meter is calibrated to read ounces of counterbalance weight required for each of the standard wheel sizes, and is also calibrated in speed units; the meter being under the control of a switch 48 to read ounces of counterbalance in one position of the switch and to read wheel speed in the other as will presently be described.

In the pulse channel, the signal from the "calibrate-select" component is received in a "filter-shifter" unit 50 wherein the signal is filtered to eliminate wheel noise and other extraneous interference, and wherein the phase of the signal is shifted correlatively to wheel speed. An inherent phenomenon of rotating unbalanced masses, which cannot be divorced from the system, is the fact that the displacement of the mass will lag the locus of the unbalance by a progressively increasing degree, up to 180°, as the wheel speed is increased. At low speeds and below the critical speed of the vibrating system, the displacement is very nearly in phase with the locus of the unbalanced weight contained within the rotating wheel and causing the vibration. As the speed is increased, the displacement of the wheel lags behind the locus of the unbalanced weight, i.e., the displacement of the wheel is not in phase with the weight position but lags behind the same. The theoretical connotation is that at resonance or the critical speed, the displacement of the wheel lags behind the position of the unbalanced weight by 90°. As speed increases beyond the critical, the phase angle increases to some point which approaches 180° lag. It is, therefore, important that speed compensation be provided when the wheel is illuminated under the strobe light in order to be able to ascertain correctly the position or locus of the unbalance. Considered conversely, if the strobe light simply flashed at the lower limit of wheel excursion (without speed compensation), there would be no way of knowing where the locus of unbalance might be, because it could be anywhere from 0° to 180° away from the bottom of the wheel in its stroboscopically "stopped" position.

To provide for accurate determination of the locus of unbalance, the present invention incorporates means for wheel speed measurement and location of the point of imbalance as a function of wheel speed. This is preferably provided by any one of a shift component 50 which constantly tracks wheel speed e.g., by counting the number of pulses in the signal received) and which adjusts the degree of phase shifting of its output signal in accordance with wheel speeds; by a shift component 50 which automatically shifts the phase of its output signal by a predetermined degree and provides a visual and/or audible signal to the operator to make his readings when the wheel is rotating at speeds within the range that is correlated to the predetermined degree of phase shift; and/or by feeding pulse or trigger signals to the strobe light solely within a pre-selected wheel speed range correlated to a predetermined or known phase shift.

In automotive wheel suspensions, the critical or resonant wheel speed is in the order of about 1,200 r.p.m. At this speed, the phase angle between wheel displacement and the locus of imbalance is approximately 90° and this is sufficiently reliable to be used as the calibration speed of the illustrated apparatus. Additionally, this is the best speed at which to make at least the initial reading for the amount and location of wheel unbalance and to determine the corrections (amount and location of counterweight) required. Consequently, for the present, we may assume that the phase shift component 50 is constructed to automatically shift the phase of the pulsating signal 90° at 1,200 r.p.m.

The thus shifted signal is then amplified and fed to a squaring amplifier 51 wherein the pulsations of the incoming signal are converted to square wave form, i.e., the signal is refined for greater precision and subsequent convenience. The square wave signal is in turn fed to a differentiator and pulse generator 52, which selects one set of signal peaks, e.g., the set of peaks produced at the lower limit of wheel excursion, and then emits a sharp pulse for or corresponding to each of said peaks. The output of the pulse generator is used to trigger the strobe light L and also to provide a speed measurement at the meter M.

Specifically, the signal from the pulse generator is fed via a first branch to an integrator or counter 53 for producing a signal that is sensible by the meter M and that is fed to the meter M via the switch 48. Preferably, means for calibrating this signal to the meter is provided in the form of a potentiometer 54. Thus, by manipulating the switch 48, the operator may read from the meter either wheel speed or the counterbalance weight required.

The pulse signal from the generator 52 is also fed to the strobe light circuit, which comprises the light L, a trigger coil 60, a discharge circuit 61, a power supply 62 for the discharge circuit and the trigger coil, an isolating transformer 63 for isolating the power supply 62 from the measuring circuit, and a pulse amplifier and discharge circuit driver 64 for feeding the pulses to the transformer and thus to the strobe light. In the line between the generator 52 and the amplifier 64, a parallel selector circuit is preferably provided to accommodate either direct supply of all pulses to the light circuit or supply only of those pulses produced within a pre-selected wheel speed range correlated to a predetermined phase shift produced by the unit 50. The latter function is attained by a speed discriminator 55 which may count the pulses and pass only those which fall within a pre-selected range of pulses rates, e.g., in the example herein selected, those pulses produced within the wheel speed range of 1,200 r.p.m., say 1,100 to 1,300 r.p.m. The alternatives provided by this circuit are preferably under the selective control of the operator by appropriate manipulation of a selector switch 56.

In use of the apparatus above described, and considering the components set up on a vehicle as shown in FIG. 1, the operator will first set the selector switch 45 to "static" balance, spin the wheel to a speed in excess of its critical speed and then release the spinner from the wheel so that the wheel may rotate and vibrate freely. If the wheel is not balanced "statically" the wheel will vibrate up and down causing the accelerometer 20 to feed signals to the circuit. If the selector switch 56 is set in the position illustrated to feed all pulses to the strobe light circuit, the light will flash at all wheel speeds. If the phase shift of the signal is compensated automatically by the unit 50 at all wheel speeds, the light will "stop" the wheel in the position where the heavy or out-of-balance part of the wheel is at the bottom of the wheel.

If compensation is provided for only a preselected wheel speed, say the 90° phase shift at 1,200 r.p.m., the operator will set the switch 48 so the meter M reads speed and will watch that meter until the indicated speed of the wheel (as it is slowing down from a greater speed) approaches 1,200 r.p.m. If desired, a green light or other indicator could be associated with the meter to signal this reading speed. The operator will then turn the switch 48 to its other position so as to obtain the meter reading for the counterbalance weight required and will then observe the wheel as it appears under the influence of the strobe light and note the position of the wheel—which at this time will appear in such position that the out-of-balance mass is at the bottom of the wheel.

Alternatively, the operator may turn the switch 56 to utilize the discriminator unit 55, whereupon he need only watch the wheel until the light starts flashing, read the position of the wheel, and read the counterbalance indication of the meter M.

The wheel is then physically stopped and manually rotated to the position observed when the wheel was stroboscopically "stopped" in the range of 1,200 r.p.m. wherein the out-of-balance mass is located substantially at 6 o'clock. The weight indicated by the meter M is then attached to the wheel at the 12 o'clock position. Preferably, this weight is divided into two equal parts, one applied to the outside of the wheel and the other applied to the inside of the wheel so as not to change the "dynamic" condition of the wheel.

The wheel is then again spun up to a speed in excess of its critical speed, i.e., above 1,200 r.p.m. If "static" balance has been attained, the wheel will not vibrate, the accelerometer 20 will not produce a signal and the strobe light L will not flash, thus telling the operator that the wheel is "statically" balanced. At this time, the operator should turn the switch 56 to its continuous reading position, so that he can observe that the wheel, in fact, is balanced at all speeds, i.e., above, at and below the critical speed. Should the apparatus of the invention give a reading by flash and meter, the operator will follow essentially the same procedure as above described, further adjusting the amount and/or position of the counterbalance weight until he has attained satisfactory balance.

When static balance has been achieved, the operator will turn the switch 45 to the "dynamic" position and follow essentially the same procedure as above described to secure dynamic balance. In applying counterbalance weight to attain dynamic balance, the operator may, of course, adjust the previously affixed "static" weights from side to side of the wheel (but without changing the circumferential location thereof).

The reliability and reproducibility of the signals generated by the pick-up of this invention accommodates and provides a further method of use of the apparatus, especially for knowledgeable operators. When an out-of-balance wheel is driven up to speed and starts to vibrate, the bumper, fender and other parts of the vehicle near the wheel will vibrate responsively to the wheel vibration, though not necessarily in phase therewith, i.e., again there may be a phase lag between wheel excursion and bumper or fender excursion. Pursuant to the invention, such vibrating parts may be used for attachment of the pick-up, thus saving the operator from crawling under the vehicle to affix the pick-up to the wheel spindle backing plate B.

In this method of use of the pick-up, the operator must first determine the phase shift, if any, between the vibrating wheel and the body part to which he has attached the pick-up. To do so, he first spins the wheel, to high speed to determine, by his own expertise and use of the meter M, whether the wheel needs balancing, and if so, the approximate amount of counterweight that is going to be required. He then stops the wheel, affixes to it a balancing weight much larger than what he has estimated will be required (for example, if he estimates the counterweight required to be about 1½ ounce, he may affix a 5 ounce weight to practically any point on the wheel). He again spins the wheel to high speed and observes the wheel position under the strobe light and meter reading, physically stops the wheel and manually rotates it to the stroboscopic "stop" position. If the part of the vehicle to which the pick-up is attached is in phase with wheel vibration, the specially applied heavy weight should be in the vicinity of the 6 0'clock position and the meter should have a reading of approximately the amount of such heavy weight. If the weight is not so positioned, the operator observes and/or measures the angular difference between such heavy weight and the 6 o'clock position and retains this information as the phase shift angle between the wheel and the vehicle part to which the pick-up is adhered. In similar manner, he correlates or calibrates the meter reading in relation to the mass of the specially applied heavy weight.

The heavy weight is then removed and the wheel spun to proceed with balancing in the same manner as above described with the exception that when the wheel is physically stopped and manually rotated to the observed stroboscopically "stopped" position, the wheel is further rotated by the amount of the previously ascertained phase shift angle so as to move the true heavy spot on the wheel to the 6 o'clock position. Weight is then applied at the 12 o'clock position pursuant to the previously ascertained "calibration" of the meter, after which testing and/or weight adjustment proceeds in the same manner as previously described.

Thus, it is seen that the objects and advantages of this invention are attained in a convenient, economical and practical manner.

While a preferred embodiment of the invention has been shown and described herein, it is to be appreciated that various changes, rearrangements and modifications may be made therein without departing from the scope of the invention as defined in the appended claims.

I claim:

1. In a stroboscopic balancer for balancing the wheels of vehicles when the wheels are elevated above the ground and spun at high speed, a pick-up unit to be connected with a normally stationary part of the vehicle, means in the pick-up unit for generating a pulse-type electric signal corresponding to the vibrations produced in said vehicle part by the spinning wheel if the wheel is unbalanced, and an electric circuit including a stroboscopic light and means connected with said pick-up unit for flashing said light onto the spinning wheel in synchronism with the electrical impulses produced by said pick-up unit in response to the vibrations created by the spinning unbalanced wheel, the improvement comprising a self-contained pick-up unit consisting essentially of a housing adapted to be adhered to a part of the vehicle that is normally stationary but which vibrates responsively to the vibrations caused by wheel imbalance, means for adhering said housing solely to the vehicle part so that housing is supported solely by the vehicle part and has no contact or engagement with the ground or other fixed reference, and accelerometer means mounted in said housing having a plane of sensitivity disposed in the vertical direction for picking up static imbalance and a plane of sensitivity disposed in the horizontal direction for picking up dynamic imbalance.

2. In a balancer as set forth in claim 1, said accelerometer means being of miniature size and said housing being in the order of 1 to 2 inches in diameter and 1 to 2 inches long.

3. In a balancer as set forth in claim 1, said housing comprising a tubular ferromagnetic shell enclosing said accelerometer means, said securing means comprising magnetic pole pieces at one end of said housing for detachably adhering said housing to a ferromagnetic part of the vehicle.

4. In a balancer as set forth in claim 3, said accelerometer means being mounted in said shell and encapsulated therein by an epoxy filling in said shell.

5. In a balancer as set forth in claim 1, said accelerometer means consisting of a first accelerometer mounted in said housing with its plane of sensitivity in the vertical direction, a second accelerometer mounted in said housing with its plane of sensitivity in the horizontal direction, a multiple conductor lead extending from said housing for supplying power to and deriving signals from said accelerometers, and switch means connected to said lead remotely of said housing for selectively deriving signals from each of said accelerometers.

6. In a balancer as set forth in claim 1, pulse counting means coupled to the output of said accelerometer means and speed determining means driven by said pulse counting means for determining the speed of rotation of a spinning unbalanced wheel.

7. In a balancer as set forth in claim 6 phase shifting means associated with said pulse counting means and coupled in the circuit of said stroboscopic light for compensating for the phase angle between wheel displacement and the locus of imbalance of the rotating wheel.

8. In a balancer as set forth in claim 7, means in the circuit of said pulse counting means and said stroboscopic light for accommodating flashing of said light only in a predetermined speed range.

9. In a balancer as set forth in claim 7, meter means coupled to the output of said accelerometer means for measuring the magnitude of the signal derived therefrom and for indicating approximately the amount of imbalance of the wheel.

* * * * *